United States Patent [19]

Funk et al.

[11] Patent Number: 5,310,712
[45] Date of Patent: May 10, 1994

[54] PROCESS FOR THE PREPARATION OF A SUPPORTED CATALYST FOR THE POLYMERIZATION OF α-OLEFINS

[75] Inventors: Guido Funk, Worms; Rainer Hemmerich, Gruenstadt; Hans Gropper, Limburgerhof; Erich Kolk, Bad Duerkheim; Godofredo Follmer, Maxdorf, all of Fed. Rep. of Germany

[73] Assignee: BASF Aktiengesellschaft, Ludwigshafen, Fed. Rep. of Germany

[21] Appl. No.: 953,629

[22] Filed: Sep. 30, 1992

[30] Foreign Application Priority Data

Oct. 4, 1991 [DE] Fed. Rep. of Germany ....... 4132894

[51] Int. Cl.$^5$ ............................ B01J 35/08; B01J 37/08
[52] U.S. Cl. .......................................... 502/9; 502/228; 502/237; 502/238; 502/256; 526/106; 526/130
[58] Field of Search .................... 502/237, 256, 9, 228, 502/238; 526/106, 130

[56] References Cited

U.S. PATENT DOCUMENTS

| | | | |
|---|---|---|---|
| 4,037,042 | 7/1977 | Mueller-Tamm et al. | 526/106 |
| 4,806,513 | 2/1989 | McDaniel et al. | 526/106 |
| 4,818,800 | 4/1989 | McDaniel et al. | 526/106 |

FOREIGN PATENT DOCUMENTS

| | | | |
|---|---|---|---|
| 3938723 | 5/1991 | Fed. Rep. of Germany | 502/256 |

*Primary Examiner*—Joseph L. Schofer
*Assistant Examiner*—David Wu
*Attorney, Agent, or Firm*—Keil & Weinkauf

[57] ABSTRACT

In a novel process for the preparation of a supported catalyst for the polymerization of α-olefins, a carrier gel (1) is first prepared by a method in which a sodium or potassium waterglass solution is introduced into a stream of an aqueous mineral acid which is subjected to angular momentum and may contain aluminum ions, longitudinally and tangentially to the stream, the resulting silica hydrosol sprayed in the form of drops into a gaseous medium and allowed to solidify into a hydrogel, and the resulting hydrogel is freed from salts by washing without prior aging and, if necessary, freed from some of the water by extraction with alcohols and/or ketones and is then dried. This gives the carrier gel (1), which is milled and is fractionated according to particle size. In a second process step, the carrier gel (1) is laden with chromium trioxide or with a chromium compound which can be converted into chromium trioxide, after which the resulting chromium-containing carrier gel (2) is heated at from 400° to 1100° C. for from 10 to 1,000 minutes in an anhydrous gas stream containing oxygen in a concentration of more than 10% by volume. In the novel process, it is essential that the drying of the hydrogel be carried out with formation of the carrier gel (1) in a fast dryer in the course of not more than 300 seconds at an inlet temperature of from 200° to 600° C. The supported catalyst prepared in this manner gives homo- and copolymers of ethylene having excellent low temperature impact strength.

7 Claims, No Drawings

PROCESS FOR THE PREPARATION OF A SUPPORTED CATALYST FOR THE POLYMERIZATION OF α-OLEFINS

The present invention relates to a novel process for the preparation of a supported catalyst for the polymerization of α-olefins, in which (1) a silica-containing carrier gel is prepared by a method in which (1.1) a sodium or potassium waterglass solution is introduced into a stream of an aqueous mineral acid which is subjected to angular momentum, longitudinally and tangentially to the stream, the resulting silica hydrosol is sprayed in the form of drops into a gaseous medium and is allowed to solidify to a hydrogel, and the resulting hydrogel is freed from salts by washing without prior aging, (1.2) if necessary, not more than 30% by weight of the water present in the hydrogel is extracted from the hydrogel (1.1) with the aid of at least one $C_1$-$C_4$-alcohol and/or $C_3$-$C_5$-ketone, (1.3) the hydrogel is dried, carrier gel formation taking place, and (1.4) the resulting carrier gel is milled and is fractionated according to particle size, (2) the resulting carrier gel particles (1) are laden with chromium trioxide or with a chromium compound which can be converted into chromium trioxide under the conditions of process step (3), after which (3) the chromium-containing carrier gel particles (2) are heated at from 400° to 1100° C. for from 10 to 1,000 minutes in an anhydrous gas stream containing oxygen in a concentration of more than 10% by volume.

The present invention furthermore relates to a novel supported catalyst for the preparation of high molecular weight homo- and copolymers of ethylene, which is obtainable by the novel process, and to the homo- and copolymers of ethylene with are prepared with the aid of this novel supported catalyst.

The process, stated at the outset, for the preparation of a supported catalyst for the polymerization of α-olefins is, except for the novel improvement, disclosed in EP-A 0 429 937. For this known process, it is essential that the hydrogel particles resulting from process step (1.1) or (1.2) is dried at not more than 180° C. under a reduced pressure of 13.3 mbar until no further weight loss occurs. Drying times of several hours are necessary here.

The supported catalyst, prepared by the known process, for the polymerization of α-olefins gives ethylene homopolymers and ethylene copolymers containing minor amounts of polymerized $C_3$-$C_{12}$-α-monoolefins, which have good low temperature impact strength, good processability and an optimum morphology of the polymer particles. However, the market requirements demand continuous further development of both the supported catalyst and the ethylene homo- and copolymers prepared therewith. In view of these market requirements, it appeared desirable further to increase the low temperature impact strength of the relevant high molecular weight ethylene homo- and copolymers without adversely affecting their good processability. The object was to be able to prepare, from polymer grit as obtained in the preparation of the polymers, moldings having a shock resistance which can otherwise be achieved only after homogenization of the polymers by, for example, roll-milling or extrusion. It was also intended to retain the existing optimum morphology of the polymer particles. For economic reasons, it was also necessary to increase the productivity of the supported catalyst.

It is an object of the present invention to provide a novel process which permits the preparation of a novel supported catalyst f or the polymerization of α-olefins in a particularly simple and reliable manner, the novel supported catalyst being particularly suitable for the preparation of high molecular weight, especially tough and readily processible homo- and copolymers of ethylene having an optimum morphology of the relevant polymer particles.

We have found that this object is elegantly achieved in a manner which could not be forseen, starting from EP-A 0 429 937, if the drying of the hydrogel particles required for the preparation of the supported catalyst was modified. In view of the prior art, it was surprising that the comparatively high drying temperatures to be used in the novel process have no disadvantageous consequences but only advantageous ones.

Accordingly, the present invention relates to a process for the preparation of a supported catalyst for the polymerization of α-olefins, in which (1) a silica-containing carrier gel is prepared by a method in which (1.1) a sodium or potassium waterglass solution is introduced into a stream of an aqueous mineral acid which is subjected to angular momentum, longitudinally and tangentially to the stream, the resulting silica hydrosol is sprayed in the form of drops into a gaseous medium and is allowed to solidify to a hydrogel, and the resulting hydrogel is freed from salts by washing without prior aging, (1.2) if necessary, not more than 30% by weight of the water present in the hydrogel is extracted from the hydrogel (1.1) with the aid of at least one $C_1$-$C_4$-alcohol and/or $C_3$-$C_5$-ketone, (1.3) the hydrogel is dried, carrier gel formation taking place, and (1.4) the resulting carrier gel is milled and is fractionated, (2) the carrier gel (1) is laden with chromium trioxide or with a chromium compound which can be converted into chromium trioxide under the conditions of process step (3), after which (3) the chromium-containing carrier gel (2) is heated at from 400° to 1100° C. for from 10 to 1,000 minutes in an anhydrous gas stream containing oxygen in a concentration of more than 10% by volume, wherein the hydrogel resulting from process step (1.1) or (1.2) is dried in process step (1.3) in the course of not more than 300 seconds in a fast dryer at an inlet temperature of from 200° to 600° C.

The present invention furthermore relates to a novel supported catalyst for the polymerization of α-olefins, which can be prepared by the novel process.

The novel process for the preparation of a supported catalsyt for the polymerization of α-olefins is referred to below as novel process for short. For the same reason, the novel supported catalyst for the polymerization of α-olefins is abbreviated below to novel supported catalysts.

The novel process starts from the preparation of the silica-containing carrier gel (1) (process step 1).

For this purpose, the silica hydrogel disclosed in DE-B-25 40 278 is first prepared (process step 1.1). This known silica hydrogel generally has a solids content of from 10 to 25% by weight (calculated as silica or aluminum silicon oxide). In general, it is spherical and has a particle diameter of from 1 to 8 mm. It is obtained by introducing a sodium or potassium waterglass into a stream of an aqueous mineral acid which is subjected to angular momentum, longitudinally or tangentially to the stream, spraying the resulting silica hydrosol in the form of drops into a gaseous medium and allowing it to solidify to a hydrogel, and freeing the resulting substantially spherical hydrogel from salts by washing without prior aging.

The mineral acid may also contain aluminum ions. If aluminum ions are to be present in the mineral acid, they are used in an amount which gives an $Al_2O_3$ content of the carrier gel (1) of from 1 to 15% by weight.

Thereafter, not more than 30% by weight of the water present in the hydrogel particles can be extracted. Organic solvents are particularly suitable for this purpose. Examples of suitable organic solvents are $C_1$–$C_4$-alcohols, such as methanol, ethanol, isopropanol and tert-butanol, $C_3$–$C_5$-ketones, such as acetone or butanone, and mixtures of these solvents. In an extraction, advantageously from 0.1 to 30, in particular from 1 to 20, % by weight of the water present in the hydrogel are extracted. In terms of the method, the extraction of the water has no special features but may be carried out in the conventional and known extraction apparatuses, such as column extractors. Furthermore, it is advantageous for the extraction if up to 50% by volume of water are added to the solvent before the extraction, if this is possible without separation. The limitation of the extraction to not more than 30% by weight of the water present in the hydrogel can be controlled via process parameters such as amounts of liquid, extraction temperature and extraction time.

According to the invention, the hydrogel resulting from process step (1.1) or (1.2) is then dried in a fast dryer at an inlet temperature of from 200° to 600° C. in the course of not more than 300 seconds (process step 1.3).

According to the invention, the drying time of the hydrogel particles should not exceed 300 seconds. Although it would be possible to use longer drying times, this may result, in an unforseeable manner, in permanent damage to the hydrogel particles and in the formation of unusable carrier gel particles. The time of 300 seconds is accordingly an upper limit which should not be exceeded if the process is to succeed. According to the invention, it is advantageous to use drying times of less than 60 seconds because this results, in a particularly reliable manner, in carrier gel particles having excellent performance characteristics. It is even more advantageous if a drying time of less than 10 seconds is maintained, because the carrier gel particles formed in the short drying time are very particularly suitable for the purposes of the present invention.

According to the invention, the inlet temperatures in the fast dryer are from 200° to 600° C. In general, it is advisable not to use higher temperatures because these result in neither a reduction in the drying time nor a further improvement in the performance characteristics of the carrier gel particles. On the contrary, higher temperatures may initiate undesirable sinter processes.

It is just as inadvisable to use temperatures below 200° C., because these result in carrier gel particles having a variable residual water content. Accordingly, the temperature range from 200° to 600° C. is an optimum range within which the temperature can be freely selected and adapted to the particular other process parameters in an excellent manner. Within this temperature range, a range from 350° to 450° C. is noteworthy because the inlet temperatures in this range have a very particularly advantageous effect on the result of the novel process.

According to the invention, fast dryers are used for drying. These may be the conventional and known pneumatic or tube dryers, fluidized-bed dryers or microwave dryers. The tube dryers are preferably used. In general, these have a tube length of 5 meters or more and a tube diameter of from 40 to 150 mm. In general, they operate with a throughput of combustion gas or hot air of from 100 to 3,000, in particular from 800 to 2,000, kg/h. The hydrogel to be dried is advantageously introduced laterally into the tube of the tube dryer, where it is picked up by the gas flowing through. The gas may flow linearly or tangentially through the tube dryer, allowing the residence time to be controlled. The carrier gel (1) resulting during the drying process is usually separated off in conventional and known separation apparatuses, such as a cyclone, after passing through the tube dryer.

The carrier gels (1) obtained in the manner described above are milled using a conventional and known milling apparatus and are fractioned by sieving (process step 1.4). It is advantageous here to fractionate the carrier gels (1) to particles having a diameter of from 1 to 2,000 μm, in particular from 1 to 300 μm. Particularly advantageous carrier gel particles (1) have a surface area of from 100 to 1,000, in particular from 200 to 600, $m^2/g$ and a pore volume of from 0.5 to 1.5, in particular from 0.8 to 1.3, $cm^3/g$. In general, the pore radius is from 40 to 80 Angström, in particular from 45 to 65 Angstrom.

The carrier gel particles (1) obtained in the novel manner are very useful for the preparation of the novel catalyst.

For this purpose, the carrier gel particles (1) prepared in the manner described above are laden, in process step (2), by known methods as described in, for example, DE-B-25 40 278 or DE-A-36 40 802, with chromium trioxide or with a chromium compound which can be converted into chromium trioxide under the conditions of process step (3) described below in detail. Loading is effected with a weight ratio of carrier gel (1) to chromium of from 100:0.1 to 100:10, in particular from 100:0.3 to 100:3.

The carrier gel (1) is advantageously suspended in a solution of chromium trioxide or of a compound which can be converted into chromium trioxide under the conditions of process step (3), after which the liquid components of the suspension, such as alcohols and/or ketones, and, if required, also water are evaporated with very homogeneous mixing of the suspension. Temperatures of from 20° to 150° C. and pressures of from 10 mbar to 1 bar are advantageously maintained here. It proves to be a definite advantage if the chromium-containing carrier gel (2) still has a certain residual moisture content. However, the volatile components should not amount to more than 20, in particular not more than 10, % by weight, based on the carrier gel (2).

Examples of suitable chromium compounds in addition to chromium trioxide and chromium hydroxide are salts of trivalent chromium with organic and inorganic acids, such as chromium acetate, oxalate, sulfate and nitrate, and chelates of trivalent chromium, such as chromium acetylacetonate. Among these, the compounds which are converted completely into chromium trioxide in process step (3) are preferred. Among these in turn, chromium(III) nitrate 9-hydrate is very particularly preferably used.

In the preparation of the chromium-containing carrier gel (2), inorganic fluoride-containing compounds may also be applied to the carrier gel resulting from process step (1). Examples of suitable inorganic fluoride-containing compounds are lithium, sodium and potassium fluoride and ammonium, sodium and potassium hexafluorosilicate, among which ammonium hexafluorosilicate is particularly advantageous. The inorganic fluoride-containing compounds can be applied from aqueous solution or as solids. They are advantageously applied in an amount such that the resulting fluoride content of the chromium-containing carrier gel particles (2) is from 0.1 to 3.2% by weight.

In process step (3) of the novel process, the chromium-containing carrier gel (2) is activated. In terms of the method, this activation has no special features but may be carried out by the methods disclosed in DE-A-15 20 467. The chromium-containing carrier gel (2) is advantageously heated at from 400° to 1100° C., in particular from 500° to 800° C., in the course of from 10 to 1,000, in particular from 150 to 750, minutes in an anhydrous gas stream containing oxygen in a concentration of more than 10% by volume and then cooled to room temperature, the novel supported catalyst resulting.

In process step (3), it is also possible to apply one or more of the abovementioned inorganic fluoride-containing compounds to the remaining chromium-containing carrier gel particles (2) or to the already present particles of the novel supported catalyst, in a conventional and known manner, in an amount of not more than 5% by weight, based on the novel supported catalyst (3). The fluorides are advantageously applied as solids.

The novel supported catalyst obtained in the novel procedure advantageously has a chromium content of from 0.5 to 3.0, in particular from 0.7 to 1.5, % by weight and can be used directly for the polymerization of α-olefins by all known processes.

Regardless of whether these known polymerization processes are batchwise or continuous suspension polymerization processes or dry phase polymerization processes in an agitated or fluidized bed, the novel catalyst is superior to that known to date and gives α-olefin polymers having excellent performance characteristics. The novel supported catalyst has particular advantages in the preparation of grit-like ethylene homopolymers and of copolymers of ethylene with minor amounts of polymerized $C_3$-$C_{12}$-α-monoolefins by polymerization of the monomer or monomers at from 70° to 150° C. and pressures of from 2 to 150 bar. The resulting polymers have a high molecular weight, characterized by limiting viscosities of from 3.0 to 6.0 dl/g, particularly great toughness, good processibility and a very good polymer morphology. In general, their melt flow index (190° C., 2.16 kp) is from 0.01 to 0.5 g/10 min. The melt flow index under high load (190° C., 21.6 kp; HLMI) is generally from 1.0 to 20 g/10 min, resulting in a melt flow ratio of from 50 to 200. In particular, however, the novel supported catalyst has an unusually high productivity compared with the prior art in the stated polymerization processes. The α-olefin polymers prepared with the aid of the novel supported catalyst are suitable in particular for the production of films and moldings by the film blowing and blow molding methods. Even the polymers prepared directly from polymer grit without prior homogenization have extremely high shock resistance. In addition, the homo- and copolymers of ethylene which are prepared with the aid of the novel catalyst are very useful for the production of containers approved for hazardous materials.

EXAMPLES AND COMPARATIVE EXPERIMENT

Example 1

The preparation of the novel supported catalyst with the aid of the novel process and its use for the polymerization of ethylene

EXPERIMENTAL METHOD

1.1 The Preparation of the Carrier Gel (1)

For the preparation of the carrier gel (1), a mixing nozzle shown in the figure of U.S. Pat. No. 38 72 217 and having the following dimensions was used: the diameter of the cylindrical mixing chamber formed from a plastic tube was 14 mm and the length of the mixing space (including the subsequent mixing zone) was 350 mm. A tangential inlet hole of 4 mm diameter for the mineral acid was located close to the entrance side of the mixing chamber, which side was closed at the end. Four further holes, likewise having a diameter of 4 mm and possessing the same inlet direction followed for the waterglass solution, the holes being 30 mm apart, measured in the longitudinal direction of the mixing chamber. Accordingly, the ratio of length to diameter for the primary mixing zone was about 10. For the adjacent secondary mixing zone, this ratio was 15. A flattened, slightly kidney-shaped tube section was pushed over the outlet end of the plastic tube to form a spray mouthpiece.

This mixing apparatus was charged with 325 l/h of 33% strength by weight sulfuric acid at 20° C. at an operating pressure of about 3 bar and 1,100 l/h of waterglass solution (prepared from technical-grade waterglass containing 27% by weight of $SiO_2$ and 8% by weight of $Na_2O$ by dilution with water) having a weight per liter of 1.2 kg/l and likewise being at 20° C. and likewise at a pressure of about 3 bar. In the mixing chamber lined with the plastic tube, an unstable hydrosol having a pH of from 7 to 8 was formed by progressive neutralization, said hydrosol remaining for about a further 0.1 second in the subsequent mixing zone until homogenization was complete before being sprayed into the atmosphere through the nozzle mouthpiece as a liquid fan jet. During the flight through the air, the jet divided up into individual drops which, owing to the surface tension, adopted a substantially spherical shape and solidified to hydrogel spheres during their flight in the course of about 1 second. The spheres had a smooth surface, were transparent as glass, contained about 17% by weight of silica and had the following particle size distribution:

| | |
|---|---|
| >8 mm | 10 percent by weight |
| 6–8 mm | 45 percent by weight |
| 4–6 mm | 34 percent by weight |

-continued

| | |
|---|---|
| <4 mm | 11 percent by weight |

The hydrogel spheres were collected at the end of their flight in a wash tower which was virtually completely filled with hydrogel spheres and in which the spheres were immediately washed salt-free without aging in slightly ammoniacal water at about 50° C. in a continuous counter-current process.

Thereafter, the spheres were comminuted in a mill to a diameter of <2 mm. The comminuted hydrogel was fed to a tube dryer having a tube length of 5 m, a tube diameter of 80 mm and an inlet temperature of 400° C. and were dried at this temperature with a residence time of 2 seconds. The resulting carrier gel (1) was separated off in a cyclone and was milled. Particles of from 1 to 300 μm were fractionated by sieving.

1.2 The Preparation of the Novel Supported Catalyst 15 kg of the carrier gel (1) described above and 40 l of a 4.1% strength by weight solution of chromium-(III) nitrate 9-hydrate in ethanol were introduced into a double-cone mixer. The ethanol was then distilled off under reduced pressure from a water pump with rotation of the mixer heated externally with steam to 130° C.

The resulting chromium-containing carrier gel (2) was heated at 600° C. for 6 hours in a fluidized bed through which air flowed, and was then cooled again. During the cooling process, the fluidized bed was flushed with nitrogen when a temperature of 140° C. was reached, in order to eliminate traces of oxygen, which interfere in the polymerization.

The resulting novel supported catalyst had a chromium content of $2 \times 10^{-4}$ mol/g, determined by elemental analysis.

1.3 The Polymerization of Ethylene with the Aid of the Novel Supported Catalyst

The polymerization of ethylene was carried out using a conventional and known loop reactor whose reaction space consisted of a circular tube having a capacity of 6 m³. The reaction space was filled with a 45% strength by weight suspension of polymer in isobutane. This suspension was circulated by a propeller pump with 3,000 rpm so rapidly that turbulent flow was present in the reactor. The suspension was kept at 104.5° C. Furthermore, the amount of suspending medium introduced and removed, i.e. 720 kg/h of isobutane in each case, and the concentration of 11% by volume of the monomeric ethylene dissolved in the suspending medium were kept constant by regulation.

During continuous steady-state operation, 900 kg/h of polymer were removed when 112.5 g/h of catalyst were introduced; this corresponds to the very high catalyst productivity of 8,000 kg of polyethylene per kg of catalyst.

At an HLMI of 2.0 g/10 minutes, the resulting polyethylene had a high molecular weight, contained very small amounts of very fine particles and had a high bulk density and excellent toughness. It proved a very particular advantage that moldings produced from polymer grit achieved a low temperature impact strength equivalent to that otherwise obtained only after homogenization (roll milling or extrusion).

For details of the experimental results, see the Table.

COMPARATIVE EXPERIMENT

The preparation of a supported catalyst according to EP-A-0 429 937 and its use for the polymerization of ethylene Example 1 was repeated, except that, instead of the drying to be carried out according to the invention, hydrogel spheres having a diameter of from 2 to 6 mm were isolated from the hydrogel spheres resulting from process step (1.1) and were subsequently dried at 180° C. under a reduced pressure of 10 mbar in the course of 8 hours; thereafter, there was no further weight loss under the stated conditions in the course of 30 minutes.

The polymerization was carried out as described in Example 1, except that 225 g/hour of catalyst were introduced and 900 kg/hour of polymer and 760 kg/hour of isobutane were removed at a polymerization temperature of 105.2° C., i.e. the catalyst productivity was only about half as high as that of Example 1. In the Table, the performance characteristics of the polyethylene of the Comparative Experiment are compared with those of Examples 1 and 2. The comparison shows that the performance characteristics of the polyethylene prepared by the known procedure do not quite reach those of the polyethylene prepared with the aid of the novel supported catalyst.

EXAMPLE 2

The preparation of the novel supported catalyst with the aid of the novel process and its use for the polymerization of ethylene Example 1 was repeated, except that 375 g of ammonium hexafluorosilicate were added to the fluidized bed in process step (3) in the preparation of the novel supported catalyst.

The polymerization was carried out as described in Example 1, except that 100 g/hour of catalyst were introduced and 900 kg/hour of polymer and 750 kg/hour of isobutane were removed at a polymerization temperature of 104.0° C., i.e. the catalyst productivity was even higher than that of Example 1.

The performance characteristics of the polyethylene prepared with the aid of the novel supported catalyst were excellent, as shown clearly in the Table.

TABLE

Performance characteristics of the novel (Examples 1 and 2) and of the known (Comparative Experiment) supported catalyst and of the polyethylene prepared therewith

| | | Example No. | | |
|---|---|---|---|---|
| | | 1 | 2 | Comp. Expt. |
| Supported catalyst: | | | | |
| (i) Process parameters: | | | | |
| Drying temperature | (°C.) | 400 | 400 | 180 |
| Drying time | (s) | 2 | 2 | $2.88 \cdot 10^4$ |
| Addition of $(NH_4)_2SiF_6$ | yes/no | no | yes | no |
| (ii) Properties of the carrier gel (2): | | | | |
| Pore Volume | (cm³/g) | 1.1 | 1.1 | 1.0 |
| Pore radius | (nm) | 50 | 50 | 50 |

TABLE-continued

Performance characteristics of the novel (Examples 1 and 2) and of the known (Comparative Experiment) supported catalyst and of the polyethylene prepared therewith

| | | Example No. 1 | Example No. 2 | Comp. Expt. |
|---|---|---|---|---|
| (iii) Productivity (g of polymer/g of catalyst) | | 8000 | 9000 | 4000 |
| Polyethylene: | | | | |
| HLMI 190° C./21.6 kp [according to DIN 53,735] | (g/10 min) | 2.0 | 2.0 | 2.0 |
| Limiting viscosity [η] [according to DIN 53,733] | (dl/g) | 520 | 490 | 520 |
| Very fine polymer particle fraction < 125 μm [according to DIN 53,477] | (%) | 0.7 | 0.6 | 0.7 |
| Bulk density [according to DIN 53,468] | (g/l) | 500 | 510 | 500 |
| Toughness $a_{ZK}$ at −30° C. [according to DIN 53,448-1B]: | (kJ/m$^2$) | | | |
| (i) Molding from polymer grit | | 316 | 310 | 223 |
| (ii) Molding from mill hide | | 326 | 330 | 268 |

We claim:

1. A process for the preparation of a supported catalyst for the polymerization of α-olefins, in which
    (1) a silica-containing carrier gel is first prepared by a method in which
        (1.1) a sodium or potassium waterglass solution is introduced into a stream of an aqueous mineral acid which is subjected to angular momentum, longitudinally and tangentially to the stream, the resulting silica hydrosol is sprayed in the form of drops into a gaseous medium and is allowed to solidify to a hydrogel, and the resulting hydrogel is freed from salts by washing without prior aging,
        (1.2) if necessary, not more than 30% by weight of the water present in the hydrogel is extracted from the hydrogel (1.1) with the aid of at least one $C_1$–$C_4$-alcohol or $C_3$–$C_5$-ketone,
        (1.3) the resulting hydrogel (1.1) or (1.2) is dried, carrier gel formation taking place, and
        (1.4) the resulting carrier gel (1.3) is milled and is fractionated according to particle size,
    (2) the carrier gel (1) is laden with chromium trioxide or with a chromium compound which can be converted into chromium trioxide under the conditions of process step (3), resulting in a chromium-containing carrier gel, and
    (3) the chromium-containing carrier gel (2) is heated at from 400° to 1100° C. for from 10 to 1,000 minutes in an anhydrous gas stream containing oxygen in a concentration of more than 10% by volume, wherein the hydrogel resulting from process step (1.1) or (1.2) is dried in process step (1.3) in the course of not more than 300 seconds in a fast dryer at an inlet temperature of from 200° to 600° C.

2. A process as claimed in claim 1, wherein the aqueous mineral acid used in process step (1.1) contains aluminum ions.

3. A process as claimed in claim 1, wherein the drying (1.3) is carried out without prior extraction (1.2) of the hydrogel.

4. A process as claimed in claim 1, wherein the carrier gel (1) has a particle diameter of from 1 to 2,000 pm, a surface area of from 100 to 1,000 m$^2$/g and a pore volume of from 0.5 to 1.5 cm$^3$/g.

5. A process as claimed in claim 1, wherein the pore radius of the carrier gel (1) is from 40 to 80 Angstrom.

6. A process as claimed in claim 1, wherein inorganic fluoride-containing compounds are added to the carrier gel (1) in process step (2) or to the carrier gel (2) in process step (3).

7. A supported catalyst for the polymerization of α-olefins, which can be prepared by a process as claimed in claim 1.

* * * * *

UNITED STATES PATENT AND TRADEMARK OFFICE
CERTIFICATE OF CORRECTION

PATENT NO. : 5,310,712
DATED : May 10, 1994
INVENTOR(S) : FUNK et al.

It is certified that error appears in the above-indentified patent and that said Letters Patent is hereby corrected as shown below:

Claim 4, column 10, line 35, "pm" should be --µm--.

Signed and Sealed this

Thirtieth Day of August, 1994

Attest:

BRUCE LEHMAN

Attesting Officer      Commissioner of Patents and Trademarks